G. S. WILLIAMSON.
Alcohol Still.

No. 107,147. Patented Sept. 6, 1870.

WITNESSES.
C. Albert Harkness
E. P. M. Keay

INVENTOR.
George S. Williamson
By his atty
R. D. Smith

G. S. WILLIAMSON.
Alcohol Still.

No. 107,147. Patented Sept. 6, 1870.

WITNESSES.
E. Albert Harkness
E. R. Mill Keay

George S. Williamson
By his atty R. W. O. Smith
Washington D.C.

United States Patent Office.

GEORGE S. WILLIAMSON, OF GALLATIN, ASSIGNOR TO HIMSELF AND EDWIN R. McKEAN, OF NASHVILLE, TENNESSEE.

Letters Patent No. 107,147, dated September 6, 1870.

IMPROVEMENT IN APPARATUS FOR AND PROCESS OF DISTILLATION.

The Schedule referred to in these Letters Patent and making part of the same.

To all whom it may concern:

Be it known that I, GEORGE S. WILLIAMSON, of Gallatin, in the county of Sumner and State of Tennessee, have invented a new and useful Improvement in Apparatus and Process of Distillation; and I do hereby declare the following to be a full, clear, and exact description of the same, reference being had to the accompanying drawing, in which—

Figure 1:
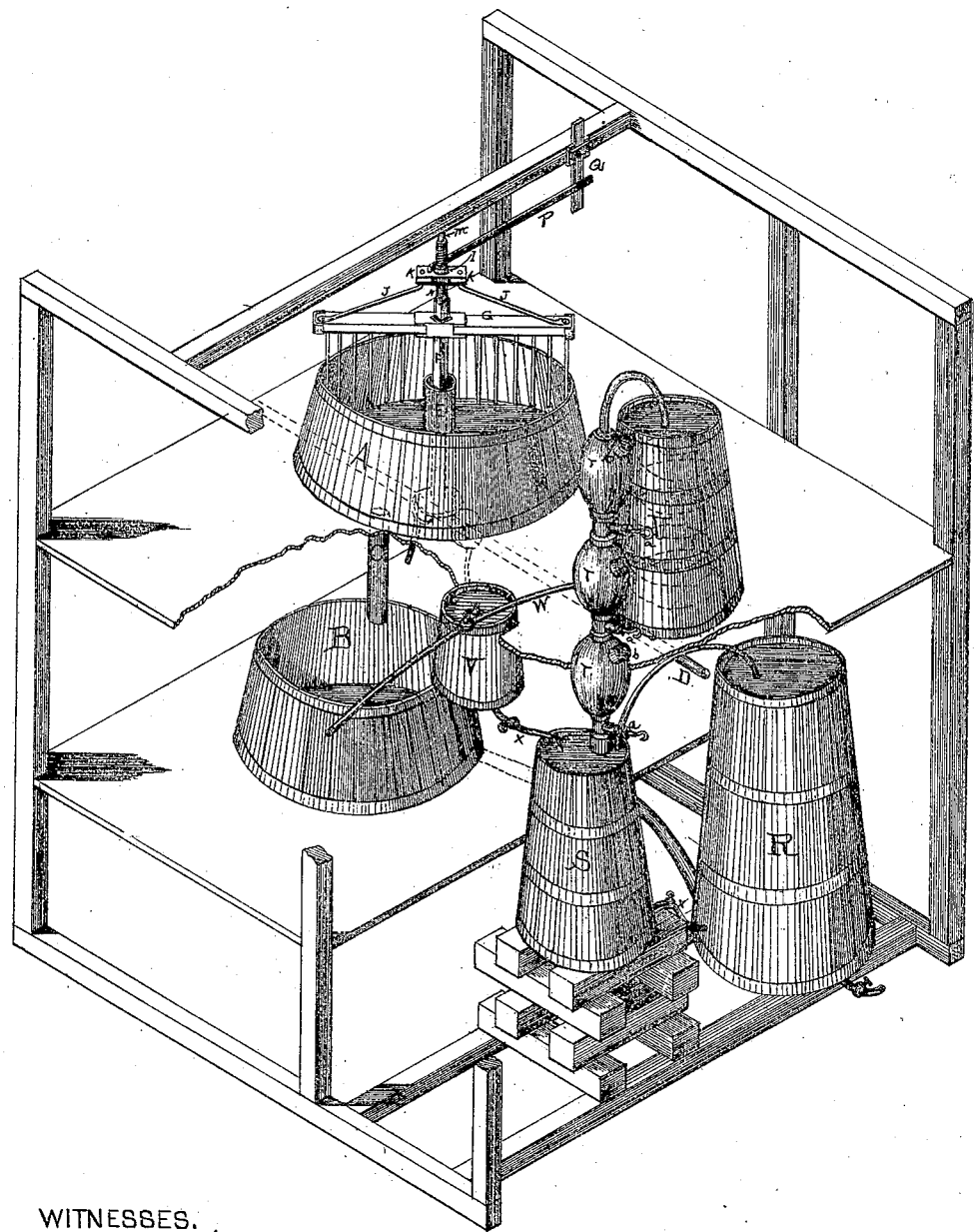
Figure 1 is an isometric perspective view of a distillery, with my invention in place.
Figure 3:
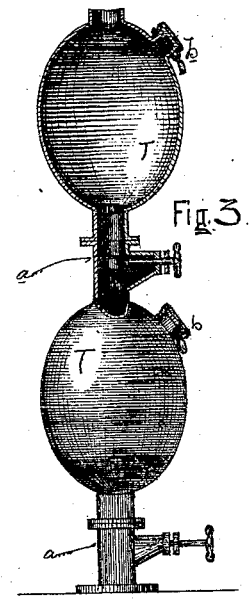
Figure 3 is an elevation, partly in section, of my coaling-apparatus.

My invention relates to the distillation of spirits to produce whisky from what is known as "sour mash," and also to the mode by which said whisky is "finished" during the continuous process of manufacture; and It consists—

First, in devices to produce and regulate, automatically, the vertical movement of the revolving rake or breaker.

Second, in the devices and their arrangement for using charcoal or other agent to purify and refine the vapors from the still without losing any portion of spirit with the spent coal.

Sour mash is that in which pot-ale or spent beer is used, instead of yeast, to produce fermentation. The mash is, therefore, very thick, and it has, until recently, been customary to employ a large number of mash-tubs, and, to perform the breaking up or mixing, hand-labor has been employed.

It is now proposed to employ one large tub in place of a large number of small ones, and machinery instead of hand-labor.

To accomplish this latter purpose, I employ a revolving rake, which, while it revolves, is also caused to penetrate gradually into the mash, as great strength and power in the machinery would be required to stir it to the whole depth at once; and, in connection with said rake, I have devised automatic devices, by means of which its movements in a vertical direction may be arrested, either when the bottom or top of the mass has been reached.

Having set forth the nature of the first part of my invention, I will particularly describe its construction and mode of operation.

A represents the mash-tub, and

B, the fermenting-tub, into which the mash runs through a pipe or other outlet, C, said outlet being closed by a valve, to retain the mash until the stirring is completed.

A driving-shaft, D, transmits power from the prime motor to the mashing machinery, and, therefore, passes directly below the mash-tubs, of which there may be a greater or lesser number, according to the capacity of the works.

The center of the mash-tub is perforated, and there is a hollow cylinder, E, which extends upward as high as the side of said tub, to form a passage for the rake-shaft F, which, for convenience, I prefer to drive from below.

The shaft F may be either square or cylindrical, but, if the latter form, a feather must be laid upon it, to couple it with the rake-head G, which revolves with said shaft, and also traverses up and down along it.

The upper part of the shaft F is provided with a screw-thread, H, and a nut, I, is fitted to said thread, and is, at the same time, loosely connected to the rake-head G, by means of the braces J J and plates K, or some other convenient way, so that, as said nut traverses said screw-thread, it will cause the rake-head G to move longitudinally along the shaft F, either up or down, as the case may be.

The upper extremity of the shaft F is provided with a journal, fitted to the bearing in the bracket L, and between said bracket and the end of the screw-thread H, being a space a little greater than the depth of the nut I, the shaft is turned blank, as at M, so that, when the nut I is run up to the top of the shaft F, it will pass clear of the screw-thread, and said shaft may continue to revolve without causing the nut to jam.

At the bottom of the shaft F is a bevel gear-wheel, N, and upon the driving-shaft D there are two corresponding bevel driving-pinions, O O, either of which may be put in gear with N, and the rake and shaft F may be caused to revolve in either direction, as may be desired.

It has been stated that the rake-head is loosely connected to the nut I, and it will appear evident that, if said nut is prevented from revolving with the shaft F, it will be forced to traverse up and down said shaft, according to the direction of its revolution. I therefore secure to said nut a lever, P, and I also secure an adjustable stop, Q, to some convenient part of the frame-work over head. Said stop may be conveniently made by placing a narrow strip of wood between two clamping-screws, so that it may be adjusted, or, in general practice, it may be sufficient to permanently secure said stop, and cut its lower end at the proper length.

When, now, the rake G is revolving and descending into the mash in the tub A, the lever P will be in contact with the stop Q, and the nut I will be thereby restrained from revolving with the shaft F, and, being so restrained, it will be compelled to traverse downward, and force the teeth of the stirrer deeper and deeper into the mash.

The stop Q must be so adjusted that, before the stirrer has quite reached the bottom of the mash-tub, the lever P will have reached the lower end of said stop, and slipped off the same. The nut will then have commenced to revolve with the shaft and rake, and the latter will not descend any further.

When the mashing has been completed, the motion of shaft and rake is reversed, and, if necessary, the lever P may be arrested by hand until the nut has traveled upward sufficiently far to cause said lever to re-engage with the stop Q.

Figure 2:
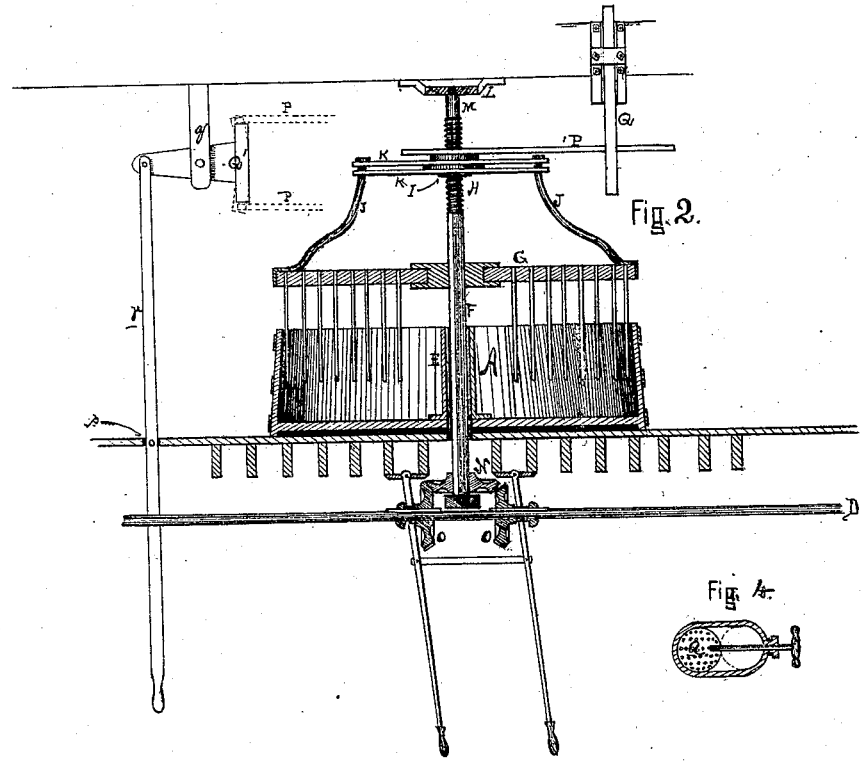
Figure 2 is a vertical sectional elevation of the mash-tub, with my rake in operative position.

Another mode of arranging this stop for the lever P is shown at the left of fig. 2.

The T-stop Q' is pivoted to the bracket q, so that the T may be raised or lowered, as shown by dotted lines, by means of a rod, r, which is pivoted to the rear end of the T, and extends downward through the floor, convenient to the hand of the attendant, who shifts the gears O O to reverse the motion of the shaft F.

With the stop Q' the screw-thread A may extend up over the space M, and the nut I will not then run off the end of the said thread, and there will be no possibility of damage by a failure to take the thread properly when motion is reversed.

The attendant, who reverses the motion of the rake, may also cause the re-engagement of lever P with the stop, from his position on the floor below, by pulling or pushing the rod r, as the case may be, and so bring the stop opposite the lever, instead of requiring the presence of an attendant at the mash-tub, who shall arrest and bring the lever to the stop.

The stop Q' may be held in position by a pin, p, set in the floor, or other convenient device, so that it may be regulated with equal facility from above or below.

If the driving-shaft D is arranged along the ceiling of the mash-tub room, then the stop Q' may be arranged with spring-latches, or other well-known devices, to retain it in proper position, and permit it to be moved, as above set forth.

The second part of my invention relates to the method of purifying the spirit vapor as it comes from the still.

I am aware that charcoal and other purifying agents have been employed to purify and finish the liquor, either by placing the coal in the still with the mash, or by placing said purifying agent in chambers, through which the vapors are caused to pass. By the first-named of these methods a very large quantity of coal is required, which not only in itself is costly, but it decreases the capacity of the still. By the second-named method a small quantity of coal will suffice, but a material quantity of spirit is retained therein, and is lost when the spent coal is discharged.

These disadvantages are obviated by my invention, because the spent coal is precipitated into the still or doubler, and there subjected to heat sufficient to volatilize the spirit which has been absorbed, before the coal and spent slop are discharged.

The nature of the second part of my invention having been set forth, I will particularly describe the construction and operation which I prefer to adopt.

In fig. 1—

R is the still, which receives its mash from the fermenting-tubs, of which B represents one.

S is the doubler;
T T are the coalers or refiners;
U is the worm-tub;
V is the low-wines tub; and
W is the pipe to conduct the finished whisky to the cistern-room.

The coalers may be placed upon the still instead of upon the doubler, as represented, if desired. The low-wines tub V and the doubler S are each provided with return-pipes, x x, in the usual manner.

The above-named devices, excepting the coalers T T, in their construction and arrangement do not differ from those in common use; therefore, no description will be required, excepting as to the coalers, which consist of two or more vessels, T, united by necks, which each contains a valve, a, constructed to arrest the solid particles of the purifier, but to permit the vapor to pass freely.

Figure 4:
Figure 4 is a plan of the valve and its chamber between the coaling-chambers.

Said valves are also provided with chambers, into which they may be withdrawn when it is desired to pass the contents of one chamber into the one next below. This is shown clearly in figs. 2 and 4.

At the side of each chamber T there should also be a trap, b, for the purpose of introducing fresh coal, or relieving any obstruction of the passage at or near the valve.

In operation the coal is only inserted at the trap of the upper chamber, and is successively passed to the chambers below, and finally into the still or doubler below, to extract the portion of spirit which it has absorbed from the vapors.

As each charge is moved downward, a fresh charge is introduced into the upper chamber and thus the vapors are always exposed to a fresh purifier in the last refining-chamber through which it passes.

I prefer to construct the purifying-chambers in the form represented, as that secures the greatest inclosed capacity, with the least material, and presents the purifier most advantageously to the passing vapors.

The discharge from one chamber to another is also rendered easy.

Having described my invention,

What I claim as new is—

1. The adjustable rake G, constructed to be raised or lowered by means of the nut I upon the screw-shaft F, in combination with the lever P and stop Q, or their equivalents, for the purpose set forth.

2. In combination with the nut I and lever J, as and for the purpose set forth, the pivoted T-stop Q', arranged to operate substantially in the manner described.

3. The arrangement of the refiners above the still or doubler, substantially as described, so that the spent coal may be discharged into said still or doubler, for the purpose of saving the spirit contained in the spent coal.

4. The refiners formed of separate vessels, T T, arranged as described, provided with trap b and with interposed perforated valves a, substantially as set forth.

5. The refiner formed of several chambers, each provided with a trap, b, and with interposed valves, substantially as described, and for the purpose set forth.

G. S. WILLIAMSON.

Witnesses:
B. F. ALLEN,
J. C. RODEMER.